Oct. 4, 1927. 1,644,156
W. B. SIBLEY
LUBRICATING SYSTEM
Filed July 28, 1923 2 Sheets-Sheet 1
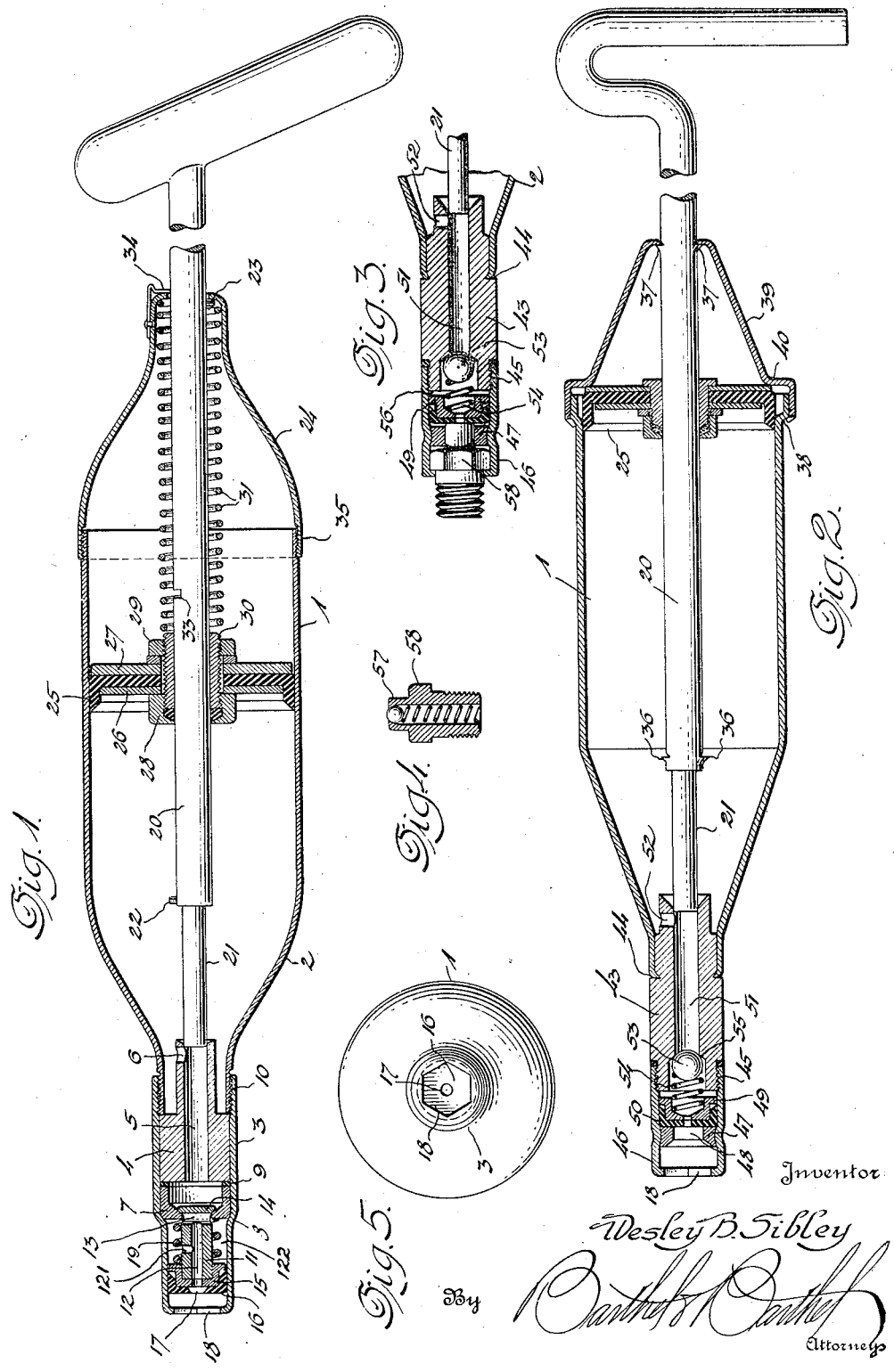

Oct. 4, 1927. 1,644,156
W. B. SIBLEY
LUBRICATING SYSTEM
Filed July 28, 1923 2 Sheets-Sheet 2
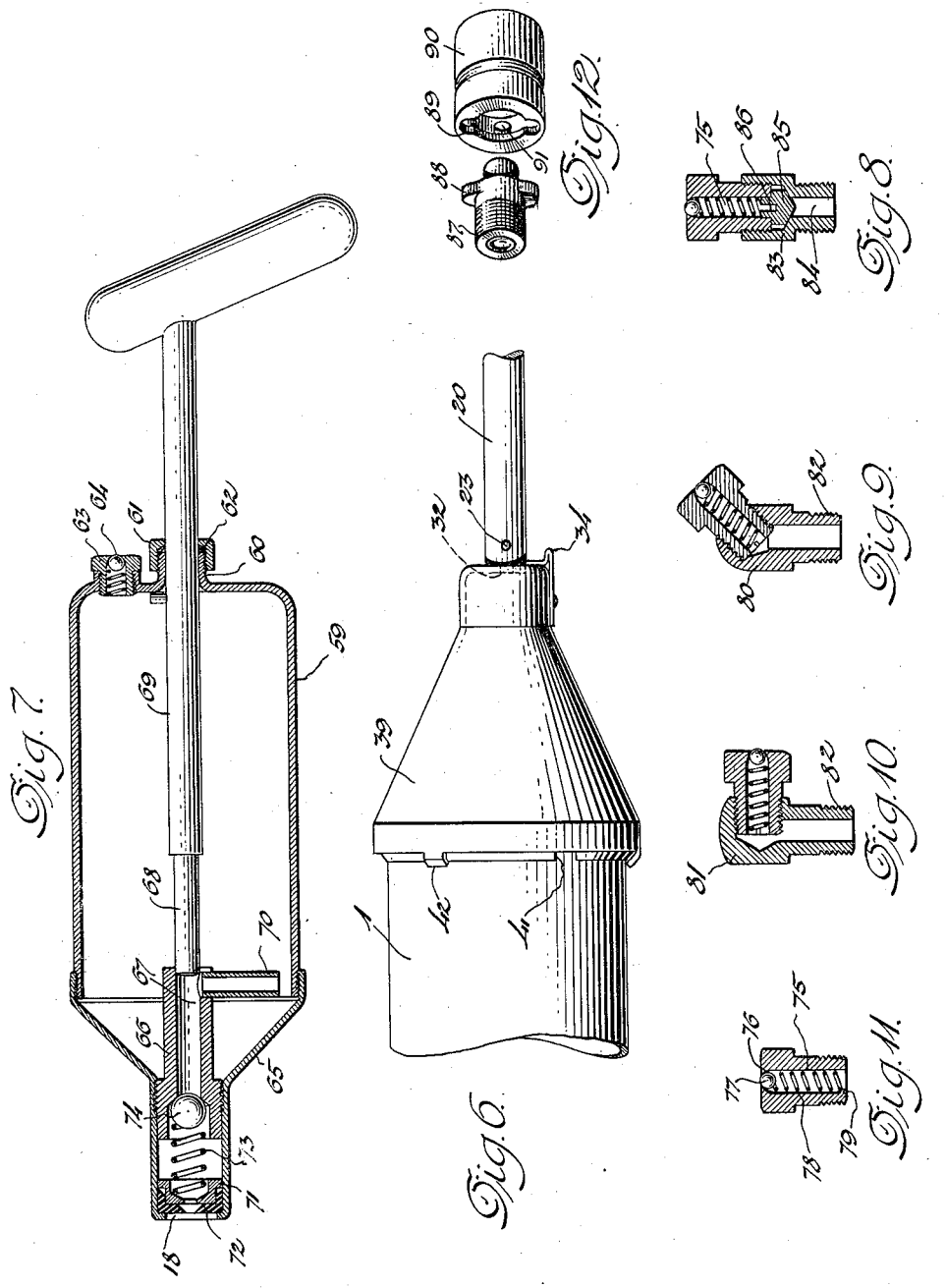
Inventor
Wesley B. Sibley
By
Attorneys Patented Oct. 4, 1927.

1,644,156

UNITED STATES PATENT OFFICE.

WESLEY B. SIBLEY, OF DETROIT, MICHIGAN, ASSIGNOR TO ACME DEVICES CORPORATION, A CORPORATION OF MICHIGAN.

LUBRICATING SYSTEM.

Application filed July 28, 1923. Serial No. 654,379.

This invention relates to lubricating systems whereby bearings or other parts of vehicles or machinery may be readily charged with grease, oil, or other lubricant.

The principal object is to provide a device by which sufficient pressure may be obtained to force the lubricant readily into the bearings so as to furnish an adequate lubrication of the working parts.

Another object is to provide a simple form of supply nozzle which can be readily attached to and detached from the lubricant nipples.

A further object is to provide a lubricant receptacle as a part of the force pump or gun which may be readily filled with oil or grease. The above and other objects are attained by a lubricator consisting of a supply reservoir or magazine, a discharge chamber, an ejecting plunger or ram, a nozzle containing a check valve, and means for attaching the nozzle to nipples which are rigidly held relative to the bearings to be lubricated. The plunger is withdrawn from the discharge chamber, a vacuum is formed therein, due to the check valve closing the opposite end, and the lubricant is forced into this empty chamber from the reservoir by atmospheric pressure. With the discharge chamber full of lubricant the ejecting plunger is forced into it thus building up a high unit pressure which opens the check valve and expels the lubricant through the nozzle into the bearing. With the discharge chamber of small diameter a high pressure is developed with but a small amount of force being applied to the plunger.

The two main features of the lubricator are the method of loading the discharge chamber by vacuum and the unloading under high pressure with very little effort.

Reference will now be had to the drawing, wherein

Figure 1 is a longitudinal sectional view of a preferred embodiment of my invention;

Fig. 2 is a longitudinal sectional view of a modified form of my invention;

Fig. 3 is a fragmentary sectional view showing the parts illustrated in Fig. 2, in a different operative position;

Fig. 4 is a longitudinal sectional view of a preferred form of nipple;

Fig. 5 is an end view of either of the devices shown in Fig. 1 or Fig. 2;

Fig. 6 is a fragmentary elevation of a portion of the construction shown in Fig. 2;

Fig. 7 is a central longitudinal sectional view of another modification of a lubricator;

Figs. 8, 9, 10 and 11 are longitudinal sectional views through various forms of nipples, and Fig. 12 is a perspective view illustrating a preferred form of lug and slot connection between inner and outer nipples of the lubricating device.

The force pump or gun illustrated in Fig. 1 comprises a tubular body 1 which acts as the receptacle for the lubricant. This body preferably has a tapering portion indicated at 2, to the outer end of which is secured a nozzle portion 3. Within the nozzle portion is mounted a cylindrical member 4 having a central bore 5 and a transverse bore 6, connecting the bore 5 with the interior of the chamber within the body 1. The member 4 is formed with a shoulder to engage the outer end of the reduced portion 2, and abutting against its face remote from the member 2 is a cylindrical member 7 having a longitudinal bore formed with an inner tapering seat, the member 7 being held against the member 4 by means of a shoulder 8 formed within the nozzle portion 3. A washer 9 is preferably interposed between the members 4 and 7.

For ease in removing the nozzle for adjustments or repairs, the connection between the portion 2 and the nozzle 3 may be made by screw-threading as indicated at 10.

A valve member 11 is provided with a longitudinal bore 12 and with a transverse bore 13 communicating with the bore 12 and located adjacent to the tapering head 14, the outer face of which is adapted to fit upon the tapering seat in the member 7. Upon the outer end of the member 11 is secured as by a drive fit, a head 15 provided with a cup washer 16 having a central opening 17 in line with the bore 12. The outer end of the member 3 is provided with a non-circular opening 18 adapted for engagement with a correspondingly shaped nipple hereafter described. A spring 19 interposed between the head 15 and the outer face of the member 7 normally holds the valve member 11 with its head in engagement with the tapering seat, but when the nozzle member 3 is brought into engagement with a nipple thrust through the opening 18 so that the washer 16 comes into engagement with the outer end of the nipple, the valve member 11 will be forced inward against the pressure of the spring 19 to bring the bore 13 into communication with the interior of the member 7 which is in direct communication with the bore 5. The valve member 11 has a transverse aperture 121 extending through the wall thereof and opening to the central bore 12 and to the chamber 122 surrounding the member 11 between the head 15 and the member 7. This transverse channel 121 permits free action of the valve member by its spring in that it prevents a partial vacuum being formed in the chamber 122. As above stated, the member 11 and the head 15 and washer 16 thereon are moved inwardly upon applying the device to a nipple thereby reducing the size of the chamber 122. Upon withdrawal from the nipple the spring 19 acts to force the valve member 11 and the head 15 outwardly increasing the size of the chamber. The member 121 permits air or even the liquid or grease discharged through the valve member to flow into the chamber and also to flow out of it upon the compression of the spring and reduction in volume of the chamber.

A rod 20 is mounted for reciprocating movement axially of the body 1, and this rod is provided with a cylindrical plunger portion 21 which has a close sliding fit within the bore 5, the longitudinal movement of the rod 20 being limited by a pin 22 adapted for engagement with the member 4 on the forward thrust of the rod, and by a pin 23 adapted to engage the inner end of the cap member 24 on the outward movement of the rod 20. When the cylindrical plunger portion 21 of the rod 20 is withdrawn from the bore 5 into the position indicated in Fig. 1, a partial vacuum will be formed therein and lubricant within the interior of the body 1 will be forced into the bore through the passage 6. When the plunger 21 is thrust into the bore 5 past the transverse bore 6, continued movement of the plunger portion will force the lubricant contained within the bore 5 and the chamber within the member 7 outward through the bore 13, the bore 12, and the opening 17, into the nipple secured upon the portion of the vehicle or machine to be lubricated.

Where the lubricant consists of a grease or other semi-solid lubricant, a piston will be provided within the body 1, the piston preferably comprising a cup washer 25 held between rigid washers 26 and 27 secured by means of nuts 28 and 29 upon a cylindrical member 30. A spring 31 interposed between the member 30 and the cap member 24 may be found advantageous in certain cases, though it has been found in practice that this spring will ordinarily not be necessary, the atmospheric pressure upon the outer surface of the piston being sufficient to press the lubricant into the bore 5.

A notch 32, as shown in Fig. 6, will be provided within the outer end of the cap 24 to permit passage of the pin 23 upon proper rotation of the rod 20. As the rod is withdrawn the pin 22 will engage with the face of the nut 28 so that the piston may be withdrawn from the body 1 until the notch 33 within the rod 20 reaches the outer end of the cap 24 where a spring 34 is provided for engagement with the notch 33 to hold the piston in inoperative position against the action of the spring 31. The cap 24 is shown as in screw threaded engagement at 35, with the outer end of the body, and when the piston has been fully withdrawn, the cap 24 may be unscrewed from the body 1, together with the piston which will be held within the larger end of the cap 24. The body 1 will then be filled with grease, whereupon the piston may be reinserted within the outer end of the body and the cap again screwed upon its outer end. Lifting the spring 34 from engagement with the notch 33 will permit the spring 31 to act to force the piston into contact with grease and maintain pressure thereupon. The pin 23 will be passed through the notch 32 and the rod 20 will then be rotated to a position in which the pin 23 is out of register with the notch, so that it will again act as a stop to limit the outward movement of the rod 20.

In the modified form shown in Fig. 2, the rod 20 is provided with struck up portions 36 and 37, which may conveniently be formed by the use of a chisel, these raised portions taking the place of the pins 22 and 23. The outer end of the body 1 is flared as indicated at 38, for greater convenience in inserting the washer 25, and the cap 39 is formed with a shoulder at 40 to engage the outer face of the piston. Instead of a screw threaded engagement between the cap 39 and the body 1, a bayonet joint may be used:—notches 41 being provided within the flared end of the body 1 to permit the passage of fingers 42 formed upon the cap 39.

It will be understood that the bayonet joint connection of the cap 39 with the body 1 may be used in conjunction with the internal arrangement of parts illustrated in Fig. 1, in which case a spring 34 will be provided as illustrated in Fig. 6, although the spring 34 and the notch 33 with which it co-operates can be omitted in the embodiment shown in Fig. 2, since in the latter a spring 31 is entirely omitted, reliance being had solely upon atmospheric pressure upon the outer surface of the piston as a means for pressing the piston longitudinally of the body.

In the embodiment shown in Figs. 2 and 3, a member 43 is secured within the forward end of the body 1, preferably by rolling the metal of the body into a groove 44 formed within the member 43. The outer end of the member 43 may be screw threaded as indicated at 45, to receive a nozzle portion 46, the outer end of which will be provided with an hexagonal or other non-circular opening 18 as in the former embodiment of the invention. Held within the nozzle 46 as by rolling the metal thereof into its grooved outer periphery, is an annular member 47 centrally perforated at 48 and adapted to limit the outward movement of a slidable member 49 having a cup washer 50, the washer and the member 49 being provided with central axial perforations in line with the perforations 48 and also in line with a bore 51 formed axially of the member 43. This bore 51 is of a size to receive the piston portion 21 of the rod 20 and the transverse perforation 52 forming a communication between the bore 51 and the interior of the body 1 correspond to the similar perforation 6 of the device shown in Fig. 1. A ball 53 is held by a spring 54 within a tapering seat 55 formed near the outer end of the bore 51.

Sufficient space is left as indicated at 56 between the member 49 and the outer end of the member 43 to permit inward movement of the end 57 of the lubricant nipple, while the nozzle 46 is being engaged with the hexagonal or other non-circular enlargement 58 formed upon the body of the nipple. After the nozzle is in place, the spring 54 will hold the washer 50 pressed into tight engagement with the outer end of the nipple to form a tight seal.

It will be seen that in the modification shown in Fig. 2, the operator may thrust the rod 20 longitudinally of the bore 51 to cause the expulsion of lubricant, even when the nozzle is not attached to a nipple, while the construction shown in Fig. 1, prevents such an operation, but the structure shown in Fig. 2, is considerably cheaper than that shown in Fig. 1, and the slight disadvantage mentioned is believed not to be serious.

In Fig. 7, the lubricator is shown as of a form intended for use with oil, and in this embodiment of the invention, the piston is entirely omitted, the oil used being such that it will flow by gravity into the lower part of the body. In this form the body 59 may have its rear end formed with a central sleeve 60, engaged by a nut 61 provided with a packing 62. Within the rear end of the body 59, a filler or inlet opening will also be provided with a suitable plug 63 which may contain an air vent or valve member provided with a ball valve 64 of any suitable construction. Upon the forward end of the body 59 will be mounted a nozzle member 65, within the interior of which will be mounted a member 66 having a central bore 67 engaged by the piston portion 68 of the axial rod 69. A tube 70 communicates with the bore 67 and extends downward closely adjacent to the bore side of the body 59. A suitable indicating mark, not shown, may be provided upon the surface of the nozzle 65 to indicate the position of this tube, so that the operator may hold the device in the proper position to insure a sufficient supply of oil at the inlet of the tube 70.

A sliding member 71 having a washer 72 is resiliently mounted within the outer end of the nozzle 65 by means of a spring 73 which also engages a ball valve 74 which is adapted to engage a tapering seat at the outer end of the bore 67. The outer end of the nozzle 65 will be provided with an hexagonal or other non-circular opening 18, as in the other embodiments illustrated in Figs. 1, 2 and 5.

In operation, there being no floating piston traveling on rod 69, the vacuum in chamber 67 produced by withdrawing the plunger 68 is depended upon entirely to suck the oil up through tube 70 to fill or load the chamber 67, this oil being ejected under pressure past the ball valve 74 when plunger 68 is forced into said chamber. With the lower end of the tube 70 close to the side wall of body 59, practically the entire amount of oil contained therein can be pumped out through chamber 67 in the above manner.

As will be understood, the chamber within body 1 or body 59 is of the type of a low pressure cylinder, while the bore 5, 51, 67, has the characteristic of a high pressure cylinder, the nozzle portions 3 or 65 serving as caps positioned at the outer ends of the low pressure cylinder, members 4, 43, and 66 also having characteristics of a cap for this end, with the cap active as the support for the high pressure cylinder. It will also be understood that the handle, rod 20 or 69, and plunger 21 or 68, form what may be termed a thrust element operative in one direction during the discharge period of the device, while the shiftable assembly at the forward or outer end of the device—and which includes member 11, 48 or 71—form what may be termed a thrust element movable, during the period of preparing the device for discharge of the contents, in the direction opposite to that of the first thrust member, said thrust members thus being movable toward each other during the preparation and discharging periods of the device manipulation.

The form of nipple illustrated in Fig. 11 has a longitudinal bore 75 terminating in a beveled seat 76 with which engages a ball 77 held against the seat by means of a spring 78, the opposite end of which is prevented from leaving the bore in any suitable manner as for example by striking a portion of the metal inward into the bore as indicated at 79. A nipple such as illustrated in Fig. 11 may be used in most locations which are convenient of access, but in certain cases it may be desired to set the nipple at an angle, in which case members 80 or 81 are provided as indicated in Figs. 9 and 10, these members consisting of tubular metallic pieces screw threaded at one end as indicated at 82, and provided at their other end with a screw threaded perforation set at any desired angle to receive a nipple of the type indicated in Fig. 11. Such nipples will ordinarily be made of steel or of cast iron, but where water is likely to cause corrosion, a modification may be used, such as indicated in Fig. 8, in which the member 83 will consist of a tubular piece of brass or other non-corrodible material, the member being provided with a longitudinal bore 84 provided at its outer end with a tapered seat to receive a correspondingly tapered member 85 also of non-corrodible material, having at its outer end a slit 86 formed within a reduced extension adapted to be held by a drive fit within the inner end of a nipple of the type illustrated in Fig. 11. The outer end of the member 83 is screw threaded to receive the nipple, and it will be seen that when the parts are screwed tightly into place, the valve member 85 will form a tight closure for the passage 84. Upon unscrewing the nipple for a turn or two, the member 85 will be unseated from its engagement with the member 83, and the lubricant may be forced through the passage 75 out of the slit 86, into the passage 84. When a sufficient amount of lubricant has been forced into the passage, the member 85 will again be pressed into tight engagement with its seat by screwing the nipple into the member 83 and thus water will be prevented from coming into contact with the nipple or the ball forming its valve. Ordinarily of course, lubricant will remain in the passage 84 so that water will not even come into contact with the closure member 85.

In Fig. 12 of the drawings I show an outer valved nipple 87 somewhat similar to the nipple shown in Fig. 4, as having opposed lugs 88 adapted to enter side recesses 89 of an inner nipple 90 and by turning these nipples relative to each other the two nipples will be coupled together. Inner nipple 90 may be provided with a pin or stop 91 which limits the turning of nipple 87 within nipple 90 so that when lug 88 strikes stop 91 the operator may know that perfect connection is established.

While I have described my invention specifically in several embodiments, it will be understood that many other changes and modifications may be made within the scope of my invention without departing from the principle thereof or sacrificing any of its advantages. It will be understood therefore, that I do not wish to be limited to the exact details of construction herein set forth, and I wish therefore to claim my invention broadly within the full and legitimate scope of the appended claims.

What I claim is:—

1. A lubricant pump comprising a body, a cap member on one end thereof, a nozzle on the opposite end of said body, a bored member in said nozzle adapted to communicate with said body, a plunger slidable in said cap and having its inner end extending into the bore of said member, a piston loose on said plunger in said body, means carried by said plunger and adapted to limit the sliding movement of said plunger in said cap, a spring encircling said plunger and bearing against said piston, and means carried by said plunger engageable with said piston so that said cap, plunger and piston may be removed from said body.

2. A lubricant pump comprising a body, a nozzle on the outer end thereof, a bored member in said nozzle normally communicating with said body, a normally closed valve in said nozzle adapted to be opened for the ejection of lubricant from said nozzle, a cap on the inner end of said body, a plunger slidable in said cap and extending into the bore of said member for ejecting lubricant therefrom, a piston on said plunger, a spring bearing against said piston, means carried by said plunger for moving said piston to place said spring under compression, and means carried by said cap to engage said plunger and hold said piston and spring relative thereto so that said cap, piston and spring may be bodily moved relative to said body.

In testimony whereof I affix my signature.

WESLEY B. SIBLEY.